United States Patent [19]

Jacobson et al.

[11] Patent Number: 5,780,081
[45] Date of Patent: Jul. 14, 1998

[54] FORTIFICATION OF FOOD WITH CALCIUM AND PROCESS OF MAKING

[75] Inventors: Mark Randolph Jacobson; Sekhar Reddy; Dharam Vadehra, all of New Milford; Elaine Regina Wedral, Sherman, all of Conn.

[73] Assignee: Nestec S.A., Vevey, Switzerland

[21] Appl. No.: 739,070

[22] Filed: Oct. 28, 1996

[51] Int. Cl.$^6$ ............................................. A23L 1/304
[52] U.S. Cl. ........................ 426/74; 426/522; 426/577; 426/580
[58] Field of Search ...................... 426/74, 577, 522, 426/580

[56] References Cited

U.S. PATENT DOCUMENTS 2,594,439  4/1952  Baker et al. ............................ 426/577
4,268,533  5/1981  Williams et al. ....................... 426/577

FOREIGN PATENT DOCUMENTS 4-36166   2/1992  Japan .
5-238940  9/1993  Japan .
8-56567   3/1996  Japan .

*Primary Examiner*—Helen Pratt
*Attorney, Agent, or Firm*—Pennie & Edmonds LLP

[57] ABSTRACT

A fortified foodstuff comprising a fortifying amount of a complex of calcium and a hydrolysed polysaccharide. The foodstuff may be a dairy-based product such as milk or a milk product.

12 Claims, No Drawings

FORTIFICATION OF FOOD WITH CALCIUM AND PROCESS OF MAKING

FIELD OF THE INVENTION

The present invention relates to the fortification of food and more particularly to the fortification of food with calcium.

BACKGROUND OF THE INVENTION

Calcium is an important element in human diets for adequate bone formation and maintenance as well as other metabolic functions, e.g. nerve transmission, blood clotting, proper cell function and muscle contraction. It is common practice to fortify food products with calcium sources which are either insoluble or soluble at around neutral pH. Many of the calcium sources currently used for fortification are insoluble or substantially insoluble at around neutral pH, e.g. calcium carbonate, calcium phosphates, calcium citrate and other organic acid salts of calcium. These materials result in precipitation and a chalky mouth feel. Other calcium sources are soluble or substantially soluble at around neutral pH such as calcium chloride, calcium hydroxide and a few organic acid salts of calcium, but these with milk proteins resulting in undesirable coagulation and sedimentation.

It is also common practice to stabilize or reduce the sedimentation of the calcium and milk proteins in the milk beverages fortified with calcium sources by adding carrageenans, pectins and/or other gums, but such materials impart an undesirably high viscosity to milk. Protein destabilisation, e.g. precipitation and coagulation, is mainly attributed to free calcium ions in the system.

It would be highly desirable to have a calcium source to fortify milk beverages and other dairy based products without coagulation and sedimentation, with improved palatability.

SUMMARY OF THE INVENTION

We have developed a complex of calcium and a hydrolysed polysaccharide which may be added to a foodstuff to fortify it with calcium to provide a stable foodstuff, without coagulation and sedimentation, which has improved palatability.

According to the present invention, there is provided a fortified foodstuff comprising a fortifying amount of a complex of calcium and a hydrolysed polysaccharide.

The foodstuff may be a dairy based product such as a milk beverage, a confectionery product, ice cream or another beverage such as a juice.

The complex may be calcium and a hydrolysed polysaccharide alone or together with an acid.

DETAILED DESCRIPTION OF THE INVENTION

The hydrolysed polysaccharide may be derived from any negatively charged polysaccharide , e.g. carboxymethylcellulose, gums or carrageenans but it is advantageously a hydrolysed pectin. Pectins typically have a molecular weight of about 10.000 to 150.000 with a Degree of Polymerisation (DP) of about 50 to 800 and are methoxylated from about 20 to 80%. Although pectins may theoretically be hydrolysed to a DP of 1 and demethoxylated to 0%, these levels are difficult to achieve. Preferably, the hydrolysed pectin has an average DP of from about 1 to 25 and more preferably from 1 to 10. The hydrolysed pectin is conveniently demethoxylated to more than 50% and preferably more than 75%.

The hydrolysis (and the demethoxylation when the polysaccharide is pectin) may be carried out by chemical, physical or enzymatic means or any combination thereof. The enzymatic hydrolysis may be carried out, for instance, by a process as described in our co-pending U.S. patent application Ser. No. 08/697,222 filed Aug. 21, 1996. The chemical hydrolysis may be carried out by treatment with an acid but is preferably carried out by treatment with an alkali. The physical hydrolysis may be carried out by shear. As these treatments are already generally known or disclosed in the art, there is no need to further describe them herein.

The complex of calcium and the hydrolysed polysaccharide may be prepared by mixing an aqueous solution or suspension of a calcium compound with an aqueous solution or suspension of a hydrolysed polysaccharide. The calcium compound may be calcium hydroxide or it may be derived from one or more of several salts, e.g. the chloride, carbonate, phosphate, sulfate or citrate. When the complex includes of calcium and a hydrolysed polysaccharide together with an acid, the acid is preferably an organic acid, e.g. citric, malic, fumaric, tartaric, succinic or lactic acid. One or more acids may be used if desired.

The complex is formed as an aqueous solution or suspension and, if desired, may be dried, for instance to a powder, by various methods commonly known to those skilled in the art.

The fortified foodstuff comprising a fortifying amount of a complex of calcium and a hydrolysed polysaccharide may be prepared by mixing the foodstuff with the complex. The complex may be in the form of a solution or suspension or it may be in a dry form such as a powder.

The amount of complex present in the fortified foodstuff may be from about 0.05 to 5%, preferably from 0.1 to 2.5%, and more preferably from 0.2 to 1% by weight based on the weight of the foodstuff.

The foodstuff may subsequently be further stabilised by adding gums, e.g. carrageenans, gum arabic, guar gum, etc., or by adding emulsifiers, e.g. mono- or di-glycerides, lecithin, sodium stearyl lactate, or the citric acid ester of monoglyceride.

Due to the stability of the complex, the fortified foodstuff may be frozen, refrigerated or shelf-stable.

EXAMPLES

The following examples further illustrate the present invention.

Example 1

Two solutions/suspensions were prepared:

A. 1.8 g calcium chloride in 10 mL water

B. 4.0 grams of pectin hydrolysates consisting of approximately 77% DP 1–3 (the remainder being primarily insoluble matter and moisture) in 40 mL water.

The solutions/suspensions are mixed and then added to 940 mL skim milk. The milk is then homogenised and pasteurised, and stored in a refrigerator at 2°–5° C. The milk was found to be stable, without sediment and of good flavor after 7 weeks.

Example 2

Three solutions/suspensions were prepared:

A. 1.2 g calcium chloride in 10 mL water

B. 2.071 g citric acid in 10 mL water

C. 4.0 grams of pectin hydrolysates consisting of approximately 77% DP 1–3 (the remainder being primarily insoluble matter and moisture) in 40 mL water.

The solutions/suspensions A and B are mixed, then solution C is added. The final mixture is then added to 940 mL skim milk. The milk is then homogenised and pasteurised, and stored in a refrigerator at 2°–5° C. The milk was found to be stable, without sediment and of good flavor after 7 weeks.

Example 3

Fortified milk is prepared as in Example 2 except that instead of being pasteurised, it is ultra high temperature treated (UHT). After being stored in a refrigerator at 2°–5° C. for three weeks, the milk was found to be stable, without sediment and of good flavor.

What is claimed is:

1. A fortified foodstuff comprising a fortifying amount of a complex of calcium and a hydrolysed pectin having a DP of from about 1 to 25 together with an acid.

2. A fortified foodstuff according to claim 1 wherein the foodstuff is a dairy based product, a confectionery product, ice cream or a beverage.

3. A fortified foodstuff according to claim 1 wherein the hydrolysed pectin is demethoxylated to more than 50%.

4. A fortified foodstuff according to claim 1 wherein the amount of complex present in the fortified foodstuff is from about 0.05 to 5% by weight based on the weight of the foodstuff.

5. A fortified foodstuff according to claim 1 which is frozen, refrigerated or shelf-stable.

6. A process for preparing a calcium fortified foodstuff which comprises adding to the foodstuff a fortifying amount of a complex of calcium and a hydrolysed pectin having a DP of from about 1 to 25.

7. A process according to claim 6 wherein the complex is in the form of a solution or suspension or a dry form.

8. A process according to claim 6 which further comprises forming the complex by mixing solution of suspension of a calcium salt with a solution or suspension of the hydrolyzed pectin, and adding between about 0.05 and 5% by weight of the complex to the foodstuff.

9. A process according to claim 8 wherein the complex is dried before being added to the foodstuff.

10. A fortified foodstuff prepared according to the process of claim 6.

11. A fortified foodstuff according to claim 10, which further comprises adding a stabilizing effective amount of a gum and/or an emulsifier.

12. A process according to claim 6, which further comprises adding a stabilizing effective amount of a gum and/or an emulsifier.

* * * * *